United States Patent
Brillet et al.

(10) Patent No.: US 9,611,862 B2
(45) Date of Patent: Apr. 4, 2017

(54) AIR BLEED HAVING AN INERTIAL FILTER IN THE TANDEM ROTOR OF A COMPRESSOR

(75) Inventors: Christophe Michel Georges Marcel Brillet, Gan (FR); Jerome Yves Felix Gilbert Porodo, Pau (FR); Laurent Pierre Tarnowski, Pau (FR)

(73) Assignee: TURBOMECA, Bordes (FR)

(*) Notice: Subject to any disclaimer, the term of this patent is extended or adjusted under 35 U.S.C. 154(b) by 1323 days.

(21) Appl. No.: 13/263,187

(22) PCT Filed: Mar. 31, 2010

(86) PCT No.: PCT/FR2010/050605
§ 371 (c)(1),
(2), (4) Date: Oct. 6, 2011

(87) PCT Pub. No.: WO2010/116071
PCT Pub. Date: Oct. 14, 2010

(65) Prior Publication Data
US 2012/0036865 A1  Feb. 16, 2012

(30) Foreign Application Priority Data
Apr. 6, 2009  (FR) .................................... 09 52227

(51) Int. Cl.
| F02C 7/18 | (2006.01) |
| F04D 29/68 | (2006.01) |
| F04D 29/28 | (2006.01) |
| F01D 25/08 | (2006.01) |

(52) U.S. Cl.
CPC .......... *F04D 29/284* (2013.01); *F01D 25/08* (2013.01); *F02C 7/18* (2013.01); *F04D 29/682* (2013.01); *Y02T 50/675* (2013.01)

(58) Field of Classification Search
CPC ... Y02T 50/676; F04D 29/284; F04D 29/682; F04D 27/0215; F04D 27/023; F01D 25/08; F02C 7/18
USPC .................................. 60/728, 751, 782, 785
See application file for complete search history.

(56) References Cited

U.S. PATENT DOCUMENTS

| 1,488,582 A * | 4/1924 | Allen ........................ F01D 5/04 |
| | | 415/143 |
| 2,283,176 A | 5/1942 | Birmann |
| 2,620,123 A | 12/1952 | Parducci |
| 2,709,893 A | 6/1955 | Birmann |

(Continued)

FOREIGN PATENT DOCUMENTS

| EP | 0 049 655 | 4/1982 |
| GB | 1 239 196 | 7/1971 |
| WO | 88 04722 | 6/1988 |

OTHER PUBLICATIONS

International Search Report issued Jun. 14, 2010 in PCT/FR10/050605 filed Mar. 31, 2010.

*Primary Examiner* — Steven Sutherland
*Assistant Examiner* — Eric Linderman
(74) *Attorney, Agent, or Firm* — Oblon, McClelland, Maier & Neustadt, L.L.P.

(57) ABSTRACT

The invention relates to a secondary air system for a compressor of centrifugal or mixed type including a rotor presenting an axis of rotation, said compressor being adapted to compress an oxidizer gas. The secondary air system includes an oxidizer gas bleed system arranged in the rotor.

11 Claims, 3 Drawing Sheets

(56) References Cited

U.S. PATENT DOCUMENTS

| | | | | |
|---|---|---|---|---|
| 2,797,858 | A * | 7/1957 | Von Der Nuell | F01D 1/08 415/148 |
| 3,493,169 | A * | 2/1970 | Abild et al. | 415/144 |
| 3,582,232 | A * | 6/1971 | Okapuu | 416/90 R |
| 3,904,308 | A * | 9/1975 | Ribaud | F04D 21/00 415/143 |
| 3,927,952 | A * | 12/1975 | Kirby | F01D 5/046 29/889.23 |
| 3,937,013 | A * | 2/1976 | Aspinwall | F02K 3/068 415/145 |
| 3,958,905 | A * | 5/1976 | Wood | F01D 5/045 415/143 |
| 4,053,261 | A * | 10/1977 | Pennig | 416/244 A |
| 4,221,540 | A * | 9/1980 | Savonuzzi | F01D 5/046 416/183 |
| 4,335,997 | A * | 6/1982 | Ewing | F01D 5/048 416/185 |
| 4,415,310 | A | 11/1983 | Bouiller et al. | |
| 4,416,581 | A * | 11/1983 | Geary, Jr. | F01D 5/087 415/1 |
| 4,428,715 | A * | 1/1984 | Wiggins | F04D 17/127 415/199.2 |
| 4,502,837 | A * | 3/1985 | Blair | F01D 5/045 415/198.1 |
| 4,587,700 | A * | 5/1986 | Curbishley | B23P 15/006 219/121.72 |
| 4,653,976 | A * | 3/1987 | Blair | F01D 5/045 415/1 |
| 4,664,598 | A * | 5/1987 | Milfs | F04D 29/281 415/121.2 |
| 4,759,688 | A * | 7/1988 | Wright et al. | 416/95 |
| 4,800,717 | A | 1/1989 | Rodgers | |
| 5,105,616 | A * | 4/1992 | Bornemisza | 60/804 |
| 5,213,473 | A * | 5/1993 | Fiala | F01D 5/048 416/183 |
| 5,215,439 | A * | 6/1993 | Jansen | F04D 29/284 415/914 |
| 6,004,095 | A * | 12/1999 | Waitz et al. | 415/119 |
| 6,047,540 | A | 4/2000 | Dev | |
| 6,276,896 | B1 * | 8/2001 | Burge et al. | 415/115 |
| 6,578,351 | B1 * | 6/2003 | Modafferi | F01D 5/022 415/144 |
| 6,589,013 | B2 * | 7/2003 | Abdallah | F04D 29/284 415/199.2 |
| 6,935,840 | B2 * | 8/2005 | Romani et al. | 416/95 |
| 7,156,612 | B2 * | 1/2007 | Warikoo et al. | 415/69 |
| 7,273,352 | B2 * | 9/2007 | Williams | F04D 29/2294 416/175 |
| 7,370,787 | B2 * | 5/2008 | Bacon | B21K 1/36 228/112.1 |
| 7,559,745 | B2 * | 7/2009 | Falk et al. | 416/188 |
| 2009/0162190 | A1 * | 6/2009 | Romani et al. | 415/115 |
| 2009/0297344 | A1 * | 12/2009 | Hill | F01D 5/048 415/208.1 |
| 2010/0232953 | A1 * | 9/2010 | Anderson | F02C 3/08 415/199.2 |
| 2011/0167792 | A1 * | 7/2011 | Johnson | F01D 17/162 60/226.3 |
| 2011/0255962 | A1 * | 10/2011 | Porodo | F04D 29/682 415/208.1 |
| 2012/0141261 | A1 * | 6/2012 | Giovannetti | F04D 29/023 415/203 |
| 2013/0098061 | A1 * | 4/2013 | Matwey et al. | 60/785 |
| 2014/0202202 | A1 * | 7/2014 | Taguchi | F04D 29/682 62/510 |
| 2015/0361993 | A1 * | 12/2015 | An | F01D 5/027 416/61 |
| 2016/0131154 | A1 * | 5/2016 | Yang | F04D 29/4213 415/183 |
| 2016/0146215 | A1 * | 5/2016 | Sgambati | F04D 29/2261 416/93 R |

* cited by examiner

AIR BLEED HAVING AN INERTIAL FILTER IN THE TANDEM ROTOR OF A COMPRESSOR

BACKGROUND OF THE INVENTION

Field of the Invention

The present invention relates to the technical field of secondary air systems for centrifugal or mixed-flow compressors, and in particular the secondary air systems for centrifugal or mixed-flow compressors of aircraft gas turbines.

Description of the Related Art

In conventional manner, a gas turbine is made up of an air inlet designed to take in an oxidizer gas, usually air, and to convey it to the inlet of a compression system that compresses the oxidizer gas. The compression system is made up of at least one compressor of mixed or centrifugal type, each centrifugal type compressor including at least one rotor mounted on a transmission shaft and at least one stator. The oxidizer gas compressed by the compression system is mixed with fuel and burnt within a combustion chamber. At least one turbine mounted on the transmission shaft converts a fraction of the kinetic energy of the gas burnt in the combustion chamber into mechanical energy serving at least to drive the compressor(s). The burnt gas exchanges heat with hot parts, e.g. the turbine(s), that it is appropriate to cool in order to limit their temperature rise.

In gas turbines of the type including at least one centrifugal or mixed-flow compressor, it is known to achieve this cooling by means of a secondary air system adapted to bleed oxidizer gas from the stator of said centrifugal or mixed-flow compressor. Bleeding is usually performed by means of a plurality of bleed orifices arranged tangentially to the flow of the fluid.

Nevertheless, the oxidizer gas may include polluting particles that act to clog, said bleed orifices at least in part. This clogging phenomenon leads to a significant reduction in the quantity of gas that is bled off by the secondary air system, and consequently it leads to a rise in the temperature in the hot parts, which in turns gives rise to a reduction in their lifetime and/or their mechanical strength.

Furthermore, the overall efficiency of the centrifugal or mixed-flow compressor may be reduced by disturbances to the flow of oxidizer gas along the rotor of the compressor, e.g. by a boundary layer of oxidizer gas in contact with the rotor becoming separated.

BRIEF SUMMARY OF THE INVENTION

A first object of the present invention is to provide a secondary air system that is robust against oxidizer gas pollution.

A second object of the present invention is to provide a secondary air system that enables the flow of air within a centrifugal or mixed-flow compressor to be improved.

In order to solve at least one of the two above-specified technical problems, a secondary air system of the invention is designed to be incorporated in a centrifugal or mixed-flow compressor adapted to compress an oxidizer gas, said centrifugal or mixed-flow compressor including a rotor presenting an axis of rotation.

Advantageously, the secondary air system of the invention comprises an oxidizer gas bleed system arranged in the rotor of the compressor. This enables polluting particles that might be contained in the oxidizer gas to be centrifuged, thereby preventing, or at least limiting, progressive clogging of the bleed system by said polluting particles.

In addition, the secondary air system of the invention improves the aerodynamics of the compressor by improving the flow of oxidizer gas along the rotor.

In a preferred embodiment, the secondary air system is designed to be incorporated in a compressor of a gas turbine of the type including a combustion chamber adapted to burn at least the compressed gas, and having at least one hot part that comes into contact with the hot burnt gas. In this variant, the secondary air system also includes a channeling system for channeling the bleed gas to at least one of the hot parts in order to lower its temperature.

In a preferred embodiment, the secondary air system is designed to be incorporated in a compressor having an outer surface. In this embodiment, the channeling system includes at least one cavity internal to the rotor, while the bleed system includes at least one orifice made in the rotor. Each orifice extends from the outer surface, leads into at least one cavity, and has an orifice axis.

The secondary air system of the invention may also include at least one of the following advantageous characteristics:

the secondary air system is designed to be incorporated in a compressor of a gas turbine of the type including at least one turbine;

the channeling system serves to send the bleed gas to the turbine;

the rotor has a hub and at least one of the orifices is made in the hub;

the secondary air system is designed to be installed in a compressor having a rotor that comprises a plurality of main blades and/or of intermediate blades;

each main blade is provided with a main leading edge;

each intermediate blade is provided with an intermediate leading edge;

at least part of at least one orifice is positioned axially relative to the axis of rotation between a main leading edge and an intermediate leading edge;

at least part of at least one orifice is positioned axially relative to the axis of rotation and in the oxidizer gas flow direction after an intermediate leading edge;

at least part of at least one orifice is positioned axially relative to the axis of rotation in front of the leading edges of the main blades;

each blade of the main or intermediate type includes a suction-side surface; and at least part of at least one orifice is positioned radially relative to the axis of rotation in the proximity of one of the suction-side surfaces.

A third object of the present invention is to provide a compressor rotor that is robust against pollution of the oxidizer gas.

To this end, a compressor rotor of the invention includes a secondary air system as defined above.

A fourth object of the invention is to provide a compressor that is robust against oxidizer gas pollution.

To this end, a compressor of the invention includes a rotor as defined above.

A fifth object of the present invention is to provide a gas turbine that is robust against oxidizer gas pollution.

A sixth object of the present invention is to provide the possibility of optimizing the bleed gas flow rate as a function of the speed of rotation of the compressor.

For this purpose, a gas turbine of the invention includes at least one compressor as defined above.

Other characteristics and advantages of the invention appear better on reading the following description of several embodiments of the invention given as non-limiting examples.

BRIEF DESCRIPTION OF THE SEVERAL VIEWS OF THE DRAWINGS

The description refers to the accompanying figures, in which.

DETAILED DESCRIPTION OF THE INVENTION

Figure 1:
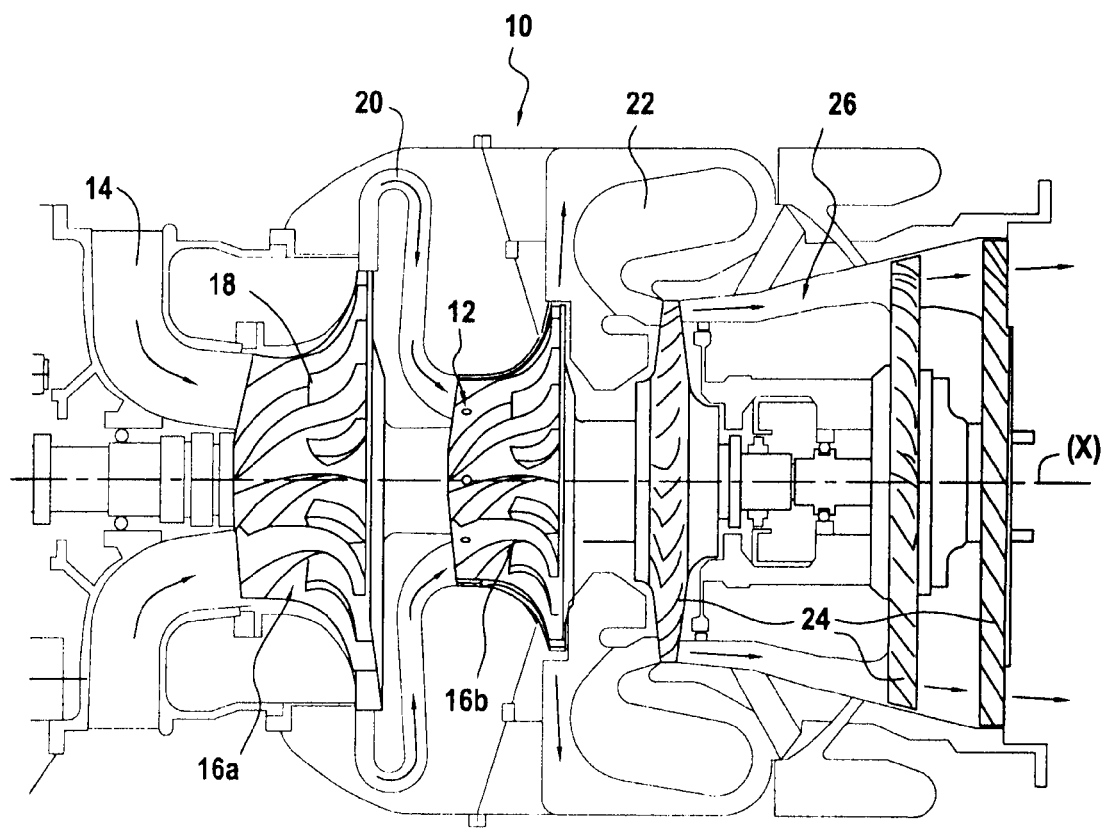
FIG. 1 is a fragmentary section view on a vertical plane of a gas turbine having a compressor fitted with the secondary air system of the invention.

FIG. 1 shows a gas turbine 10 fitted with a secondary air system 12 of the invention. The gas turbine 10 is preferably designed for fitting to an aircraft, such as helicopter, for example.

The general functioning of a gas turbine 10 is itself known and is not described in detail in the present description.

In the embodiment shown, the gas turbine 10 has an inlet 14 for receiving oxidizer gas, usually air, and in particular, below in the present specification, this is air-intake gas.

Air-intake gas includes or may include pollution in the form of particles in suspension, e.g. dust, pollen, or water vapor.

The air-intake gas is subsequently compressed in at least one compression stage. In this embodiment, the gas turbine 10 has first and second centrifugal compressors 16a and 16b arranged in series, such that the air-intake gas feeds the first centrifugal compressor 16a, and the gas compressed by the first centrifugal compressor 16a feeds the second centrifugal compressor 16b.

In conventional manner, each centrifugal compressor 16a, 16b comprises a rotor 18 that is movable in rotation about an axis of rotation (X) and that is adapted to accelerate the gas, and a stator 20 that is adapted to convert at least a fraction of the kinetic energy of the gas into an increase in the pressure of the gas.

In the embodiment shown, the secondary air system 12 of the invention is installed in the second centrifugal compressor 16b, i.e. the downstream compressor.

The gas compressed by at least one compressor 16a, 16b, referred to below in the present specification as the "compressed gas", is subsequently taken to a combustion chamber 22 where it is mixed with a fuel and then burnt.

The burnt gas from the combustion chamber 22, referred to below in the present specification as "burnt gas", is then taken to at least one turbine 24 adapted to convert at least a fraction of the kinetic energy of the burnt gas into mechanical energy, serving at least to drive the compressors 16a, 16b.

The parts that are in contact with the burnt gas constitute "hot" parts 26. The burnt gas exchanges heat with said hot parts 26.

Certain hot parts need to be cooled in order to limit their rise in temperature e.g. in order to limit damage thereto. Each turbine 24 constitutes an example of a hot part 26 in which temperature rise needs to be limited in order to avoid damage. This bleed air may also be used for pressurizing certain bearings of the engine.

In a variant embodiment, the secondary air system 12 of the invention is installed in similar manner, mutatis mutandis, in the first centrifugal compressor 16a.

In general, if the gas turbine 10 has a plurality of centrifugal compressors, the secondary air system 12 of the invention may be installed in equivalent manner in each of said centrifugal compressors and/or in more than one centrifugal compressor.

Furthermore the secondary air system 12 may be installed in any type of centrifugal compressor and/or in any type of gas turbine including at least one centrifugal compressor. For example, the secondary air system 12 may be installed in a gas turbine 10 of the type comprising a multi-stage compressor provided with an end-of-compression stage that is a mixed-flow stage or a centrifugal stage.

Figure 2:
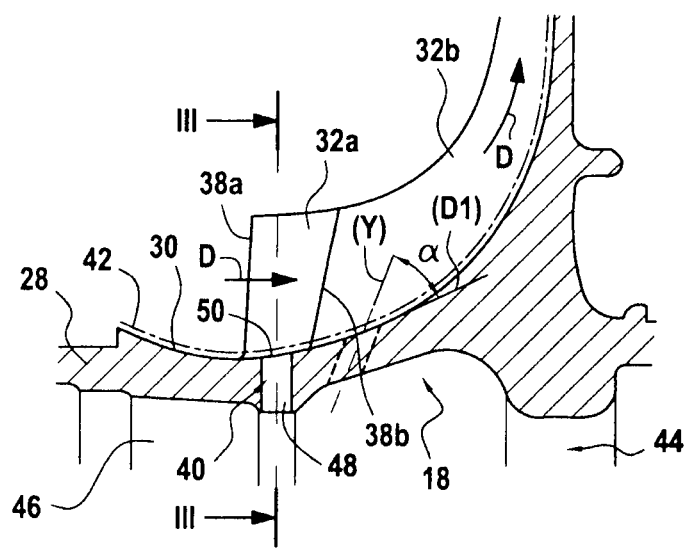
FIG. 2 is a fragmentary view of the rotor of the compressor fitted with the secondary air system of the invention, in section on the plane of FIG. 1.
Figure 3:
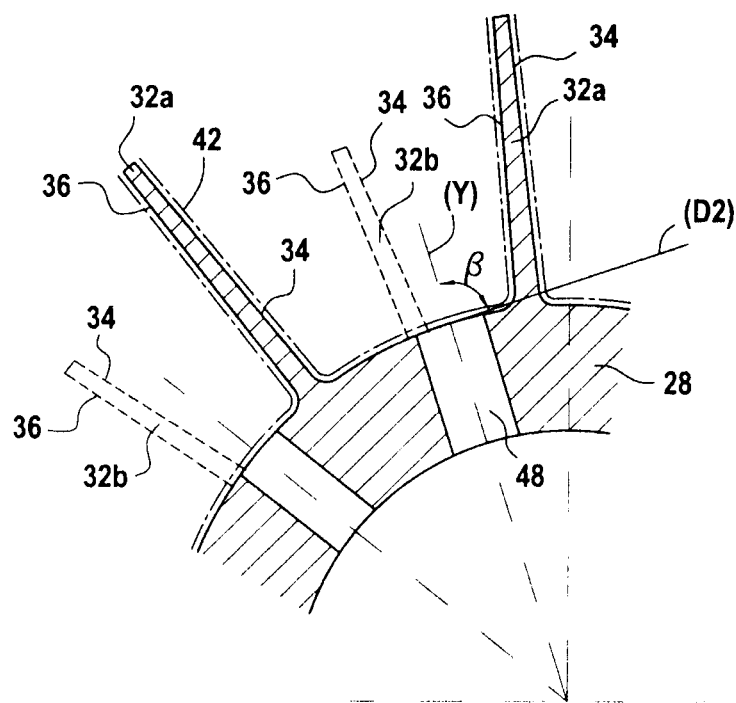
FIG. 3 is a fragmentary view of the FIG. 2 rotor on a section plane defined in FIG. 2.

FIGS. 2 and 3 are detail views of the rotor 18 of the second centrifugal compressor 16b fitted with a secondary air system 12 of the invention.

In conventional manner, the rotor 18 comprises a hub 28 defined at least in part by an outer surface 30 from which there extend a plurality of blades of a main type 32a alternating with blades of an intermediate type 32b.

The oxidizer gas penetrates into the rotor 18 axially relative to the axis of rotation (X) and then flows towards the stator 20 along the outer surface 30. The speed of the oxidizer gas increases all along its flow as a result of centrifugal acceleration. The oxidizer gas flows in a flow direction D that is directed from the upstream end of the rotor 18 towards its downstream end.

Each blade 32a, 32b conventionally presents opposite pressure and suction sides 34 and 36 that project from the outer surface 30 of the rotor 18. The suction-side surface 36 is connected to the pressure-side surface 34 by a main leading edge 38a, for a main blade 32a, and by an intermediate leading edge 38b, for an intermediate blade 32b.

In the invention, the secondary air system 12 bleeds oxidizer gas from the rotor 18. For this purpose, the secondary air system 12 comprises an oxidizer gas bleed system 40 in the rotor 18. The gas bled off by the bleed system 40 is referred to below in the present specification as "bleed gas".

The flow of oxidizer gas along the blades 32a, 32b of the second compressor 16b takes place along a plurality of fluid flow lines (not shown). The fluid flow lines substantially in contact with the outer surface 30, the pressure-side surface 34, or the suction-side surface 36 of the blades 32a, 32b define a boundary layer 42. The boundary layer 42 is sensitive to the problem of separation that is well known to the person skilled in the art and that gives rise to turbulence within the flow of oxidizer gas, and consequently to losses of efficiency in the centrifugal compressor.

Bleeding oxidizer gas from the boundary layer 42 serves advantageously to minimize any risk of separation of the boundary layer 42, thereby increasing the overall efficiency of the second centrifugal compressor 16b and improving the flow of oxidizer gas along the blades 32a, 32b of the rotor 18.

In a preferred embodiment, the secondary air system 12 takes the bleed gas to at least one hot part 26 and preferably to at least one turbine 24 in order to regulate its temperature. For this purpose, the secondary air system 12 includes a channeling system for channeling the bleed gas 44. The gas channeled by the channeling system 44 is referred to as "channeled gas" below in the present specification.

By bleeding oxidizer gas from the rotor 18 it is possible to centrifuge polluting particles that might be contained in the oxidizer gas, thereby purifying the oxidizer gas. This avoids clogging the bleed system 40 and thereby avoids a reduction, over time, in the quantity of oxidizer gas that is bled off.

In the embodiment shown, the channeling system 44 includes a cavity 46 internal to the rotor 18, and the bleed system 40 includes a plurality of angularly-distributed orifices 48 made in the hub 28 of the rotor 18.

In a variant of the invention that is not shown, the channeling system may include a plurality of cavities that may optionally be interconnected. Under such circumstances, each cavity may include one or more orifices having positions that differ from one cavity to another.

Each orifice 48 extends from a top face 50 arranged in the outer surface 30 of the rotor 18 and leads into the axial chimney 46. Each orifice extends substantially along an orifice axis (Y). In addition, each orifice 48 is preferably, but not necessarily, substantially cylindrical in shape, it being specified that each orifice may present a section that is constant or indeed that varies.

In the embodiment shown, at least part of each orifice 48 is axially positioned relative to the axis of rotation (X) between a main leading edge 38a and an intermediate leading edge 38b. More particularly, the top face 50 of each orifice 48 is positioned axially relative to the axis of rotation (X) between a main leading edge 38a and an intermediate leading edge 38b.

In a variant embodiment, at least part of each orifice 48 is positioned axially relative to the axis of rotation (X) and in the flow direction D after an intermediate leading edge 38b.

The orifices 48 could also be arranged between the upstream end of the rotor and the main leading edge 38a.

At least part of each orifice 48 is also positioned radially relative to the axis of rotation (X) close to a suction-side surface 36. More particularly, the top face 50 of each orifice 48 is positioned radially relative to the axis of rotation (X) closer to the suction-side surface 36 of a main blade 32a than to the pressure-side surface 34 of the adjacent main blade 32a.

Figure 4:
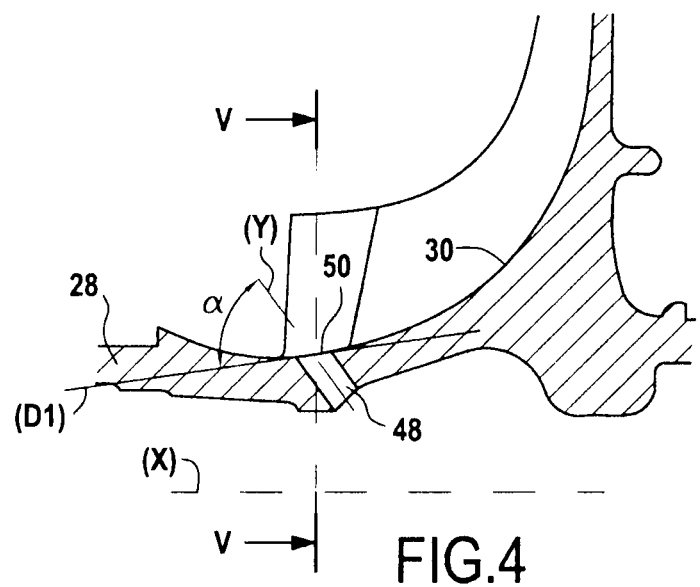
FIG. 4 is a fragmentary view of the rotor of the compressor fitted with a secondary air system in a variant of the invention, shown in section on the plane of FIG. 1.

As shown in FIG. 4, a first angle of inclination α is defined for each orifice as being the oriented angle formed between a straight line (D1) that is tangential to the outer surface 30 and that is coplanar with the axis of rotation (X), and the axis (Y) of the orifice.

Figure 5:
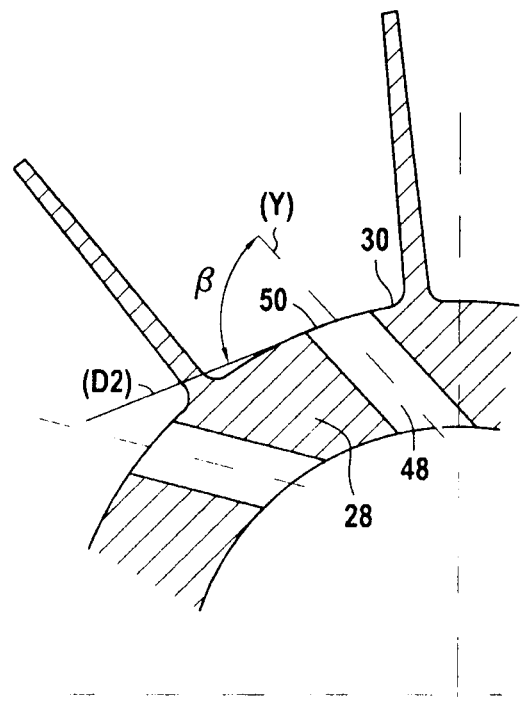
FIG. 5 is a fragmentary view of the FIG. 4 rotor in the section plane V-V defined in FIG. 4.

As shown in FIG. 5, a second angle of inclination β is defined for each orifice as being the oriented angle formed between a straight line (D2) that is tangential to the outer surface 30 and that is orthogonal to the axis of rotation (X), and the axis (Y) of the orifice.

When the first angle α and/or the second angle β of an orifice 48 lie(s) in the range 0 to 90°, the orifice 48 improves resistance to pollution to the detriment of the quantity of air that is bled off by the secondary air system 12. Conversely, the orifice 48 increases the quantity of air that is bled off by the secondary air system 12 to the detriment of robustness against pollution when the first angle α and/or the second angle β of an orifice 48 lie(s) in the range 90° to 180°.

Thus, it is possible to modify or adjust the compromise between the quantity of oxidizer gas that is bled off and the robustness against pollution of the secondary air system 12 by acting on the first angle α and/or the second angle β of each orifice 48 making up the secondary air system 12. In addition, it is possible to adjust the quantity of oxidizer gas that is bled off for a given speed of rotation of the compressor by acting on the first angle α and/or the second angle β of each orifice 48 making up said secondary air system 12.

Consequently, the flow rate of air flowing through each orifice 48 may be predetermined by setting the first angle of inclination α at a first predetermined value and/or by setting the second angle of inclination β at a second predetermined value. It can thus be understood that for a given speed of rotation of the compressor, the value of the first angle α and/or the value of the second angle β are parameters that enable the flow rate of air flowing through the orifices 48 to be adjusted to a predetermined value.

Naturally, the above-described embodiment of the orifices 48 is not of a limiting nature. For example, it is possible to make the orifices in a portion of the rotor 18 other than the hub 28. It is also possible to provide orifices 48 of varying axial positioning and/or azimuth position and/or radial position and/or first angle α and/or second angle β.

The invention claimed is:

1. A secondary air system for a centrifugal or mixed-flow compressor having a single-piece rotor presenting an axis of rotation, said centrifugal or mixed-flow compressor being adapted to compress an oxidizer gas, the secondary air system comprising:
   an oxidizer gas bleed system arranged in the single-piece rotor; and
   a channeling system for channeling a bleed gas to a hot part in contact with burnt gas from a combustion chamber burning compressed gas, the hot part being part of a turbine,
   wherein the channeling system includes at least one cavity internal to the single-piece rotor and a plurality of orifices made in an outer surface of the single-piece rotor, each orifice having an orifice axis extending from the outer surface of the single-piece rotor and leading into said at least one cavity internal to the single-piece rotor, the outer surface of the single-piece rotor having a plurality of main blades and a plurality of intermediate blades alternating with the plurality of main blades circumferentially on the outer surface of the single-piece rotor such that each intermediate blade on the outer surface of the single-piece rotor is between two main blades on the outer surface of the single-piece rotor in a circumferential direction, each main blade being provided with a main leading edge and each intermediate blade being provided with an intermediate leading edge which is axially downstream of the main leading edge,
   wherein a trailing edge of each main blade is circumferentially aligned with a trailing edge of intermediate blade, each main blade being longer than each intermediate blade, each main blade being continuous between the respective main leading edge and the trailing edge of the respective main blade, and each intermediate blade being continuous between the respective intermediate leading edge and the trailing edge of the respective intermediate blade, and
   wherein a part of one of the orifices is positioned axially between the main leading edge and the intermediate leading edge, and is positioned circumferentially between adjacent one of the intermediate blades and one of the plurality of main blades.

2. A secondary air system according to claim 1, wherein the compressor is a compressor of a gas turbine of the type including the turbine, and wherein the channeling system enables the bleed gas to be sent to the turbine.

3. A secondary air system according to claim 1, wherein the single-piece rotor includes a hub, and wherein at least one of the orifices of the plurality of orifices is formed in the hub.

4. A secondary air system according to claim 1, wherein each blade of main or intermediate type has an suction-side surface and a pressure-side surface opposite to the suction-side surface, and wherein at least the part of one of the orifices is positioned radially relative to the axis of rotation closer to the suction-side surface of the one of the main blades than to the pressure-side surface of a main blade adjacent to the one of the main blades.

5. A secondary air system according to claim 1, wherein a flow of air flowing through each of the plurality of orifices is set by setting at least one of a first value for a first angle of inclination defined for each of the plurality of orifices as being an oriented angle formed between a first straight line that is tangential to the outer surface of the single-piece rotor and that is coplanar with the axis of rotation, and the axis of the orifice, or a second value for a second angle of inclination defined for each orifice as being the oriented angle formed between a second straight line that is tangential to the outer surface and that is orthogonal to the axis of rotation, and the axis of the orifice.

6. A secondary air system according to claim 5, wherein the first angle of inclination in a range 0° to 90°.

7. A secondary air system according to claim 5, wherein the second angle of inclination in a range 0° to 90°.

8. A single-piece rotor of a centrifugal or mixed-flow compressor including the secondary air system according to claim 1.

9. A centrifugal or mixed-flow compressor including the rotor according to claim 8.

10. A gas turbine including the centrifugal or mixed-flow compressor according to claim 9.

11. A secondary air system according to claim 1, wherein a top face of the one of the orifices of the plurality of orifices is positioned axially between the main leading edge and the intermediate leading edge.

* * * * *